June 19, 1951 D. W. FELSING 2,557,731
PLANT SUPPORT
Filed Oct. 21, 1946

INVENTOR.
Daniel W. Felsing
BY
ATTORNEYS

Patented June 19, 1951

2,557,731

UNITED STATES PATENT OFFICE 2,557,731

PLANT SUPPORT

Daniel W. Felsing, South San Francisco, Calif.

Application October 21, 1946, Serial No. 704,679

2 Claims. (Cl. 47—47)

This invention relates to a plant support device and more particularly to a multi-positionable trellis.

An object of the invention is to provide a plant support device which is readily adaptable for the training of plants and flowers having variable growth characteristics.

Another object of the invention is to provide a plant support device which may be readily changed in outline by relative movement of its component parts to achieve a variable support pattern to train the growth of a wide variety of plants, flowers, and the like.

A further object of the invention is to provide a plant support device comprising a plurality of universally jointed links variably positionable to provide a multiform trellis.

Other objects and advantages of the invention will be apparent from the following description taken in conjunction with the drawing forming a part of this specification, and in which.

Figure 1:
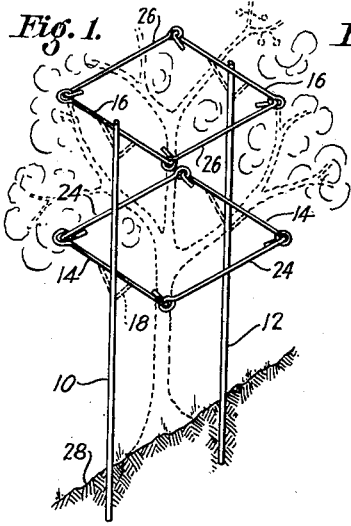
Figure 1 is a view in perspective of the plant support device of the invention, showing the device inserted in the ground so as to support a plant indicated in shadow outline.
Figure 2:
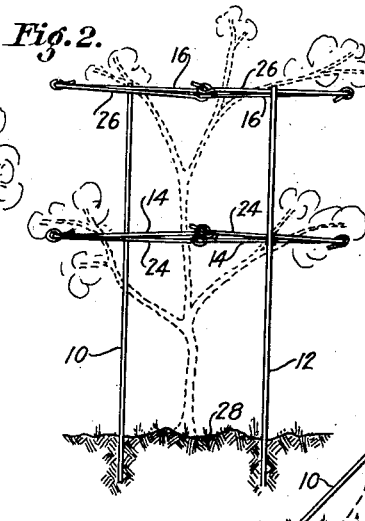
Figure 2 is a view in elevation showing another configuration which the device of Figure 1 may readily take for use as a plant support.
Figure 3:
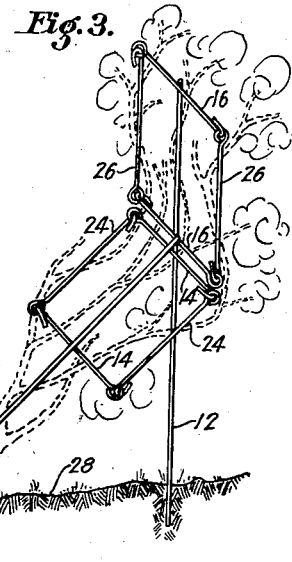
Figure 3 is a view in perspective demonstrating still another configuration of the device.
Figure 4:
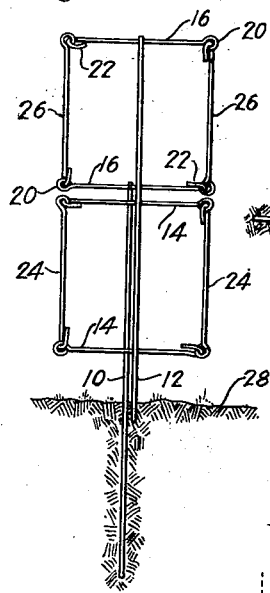
Figure 4 is a view in elevation of yet another configuration of the device.
Figure 5:
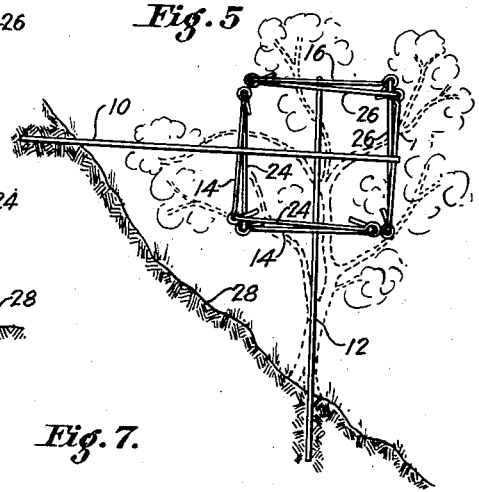
Figure 5 is a view in elevation showing a configuration of the device particularly adapted for the support of hillside plants.
Figure 6:
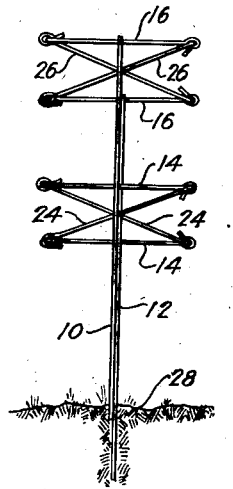
Figure 6 is a view in elevation of another configuration of the plant support device.

Referring to the drawing for more specific details of the invention, the plant support device is preferably comprised of a pair of legs 10 and 12, each leg having rigidly secured thereto, as by welding, a lower link 14 and an upper link 16. Truss arms 18, indicated in dotted outline in Figure 1, may be provided to enhance the rigidity of links 14 and 16. Each of the links 14 and 16 is provided with a substantially closed eye 20 at one end thereof, and a hook 22 of the spring clip type at the other end thereof, as most clearly indicated in Figure 4. A pair of links 24 and another pair of links 26, each of said links similarly having a closed eye at one end thereof and a spring hook at the other end thereof, serve to connect, respectively, the lower links 14 and the upper links 16.

The hook eye structure of the link ends enables a ready assembling or disassembling of the plant support device, but this particular structure is not essential, as any means for connecting the adjacent ends of the links together may be used provided that such connecting means enables a free pivoting action of said links.

It is obvious from the described structure of the device that any relative movement between the legs 10 and 12 will effect a shift in the pivotable link structure to cause the device to assume a variety of configurations, a number of which are demonstrated in Figures 2–6 of the drawing. Since the link 14 and the link 16 on each of the legs 10 and 12 are rigidly secured thereto, the number of possible configurations of the device is only limited by the fact that in each configuration the link 14 and the link 16 on each of the legs 10 and 12 may not be shifted out of their parallelism. However, as is apparent in Figure 5, the two links 16 may be shifted so as to be non-parallel, and the two links 14 may be also non-parallel. Both Figure 5 and Figure 6 demonstrate configurations of the device in which the links 26 and the links 24 are non-parallel.

By shifting the legs 10 and 12 with respect to each other to cause a change in the link configuration, and then inserting the legs in the ground, as indicated at 28 in Figures 1–6, the device may be accommodated to the characteristic growth pattern of a flower, plant, or the like, or, conversely, the growth of the flower or plant may be trained as desired to follow a particular configuration of the device.

Figure 7:
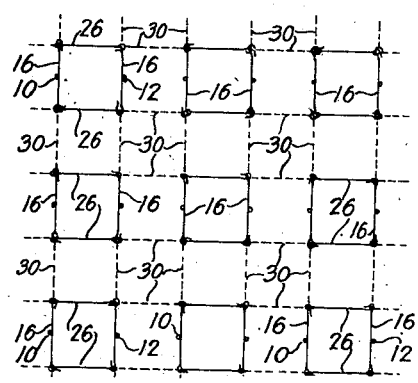
Figure 7 is a plan view of a plurality of the plant support devices showing the manner in which they may be coupled together for mutual support in the formation of a particular geometrical pattern.

When it is desired to support a plurality of flowers, for example, in spaced and parallel alignment, a particular number of such flowers may be supported by half that number of support devices by interconnecting the spaced devices by links 30, indicated in dotted outline in Figure 7. The links 30, when so arranged, provide for a doubling of the plant support capacity of a particular number of support devices.

While the basic embodiment of the invention has been shown and described, it is to be understood that this embodiment is subject to modification within the spirit of the invention and the scope of the appended claims.

What I claim as new and desire to secure by Letters Patent is:

1. A plant support device having a pair of ground insertable legs of equal length, a pair of spaced parallel links rigidly secured to each leg in oppositely disposed relation, each of said links being provided with an eye at one end and a semi-closed hook at the other end, said links being arranged so that the eyes of the links carried by one of said legs are opposite the hooks of the links carried by the other of said legs, and other links similar in form interconnecting the ends of the links on one leg with the ends of corresponding links on the other leg to form a plurality of loosely and freely jointed link parallelograms, with the spacing between the links secured to each leg being in excess of the length of said other links.

2. A plant support device having a pair of ground insertable legs of equal length, a pair of spaced parallel links rigidly secured to each leg in oppositely disposed relation, each of said links being provided with an eye at one end and a semi-closed hook at the other end, said links being arranged on said legs so that the eyes of the links carried by one of said legs are opposite the hooks of the links carried by the other of said legs, other links similarly provided with eye and hook ends interconnecting the ends of the links on one leg with the ends of corresponding links on the other leg to form a plurality of loosely and freely jointed link parallelograms, each joint consisting of an eye of one link and hook of another, with the spacing between the links secured to each leg being in excess of the length of said other links.

DANIEL W. FELSING.

REFERENCES CITED

The following references are of record in the file of this patent:

UNITED STATES PATENTS

| Number | Name | Date |
|---|---|---|
| 374,906 | Rovane | Dec. 13, 1887 |
| 760,879 | Kunzman | May 24, 1904 |
| 1,635,071 | Comstock | July 5, 1927 |

FOREIGN PATENTS

| Number | Country | Date |
|---|---|---|
| 11,733 | Great Britain | June 5, 1905 |